United States Patent Office 3,508,267
Patented Apr. 21, 1970

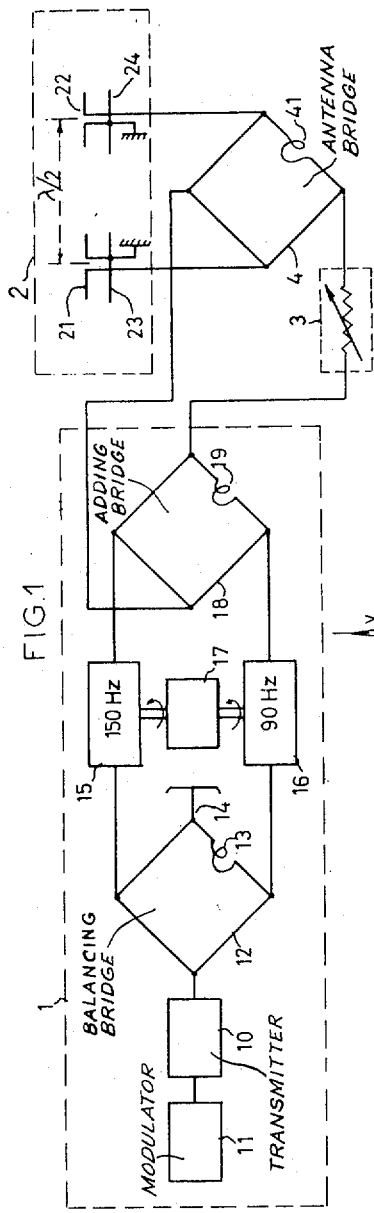
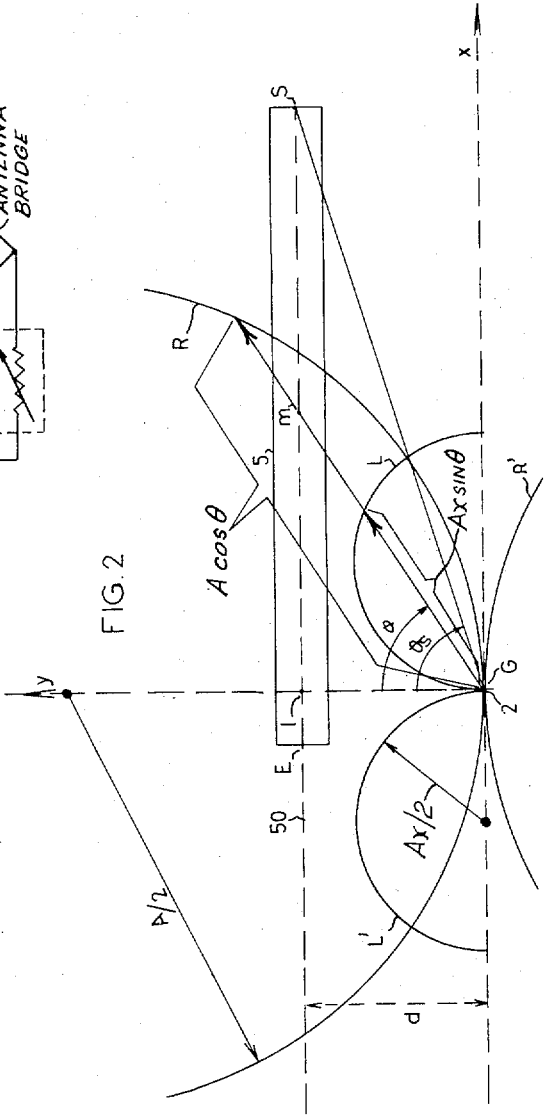

3,508,267
AIRPORT RUNWAY DISTANCE METER
Jacques Y. Villiers, Orly-Aerogare, France, assignor to Agence Nationale de Valorisation de la Recherche, Paris, France, a body corporate of France
Filed Dec. 24, 1968, Ser. No. 786,721
Claims priority, application France, Dec. 28, 1967, 134,122
Int. Cl. G01s 1/14
U.S. Cl. 343—109      3 Claims

ABSTRACT OF THE DISCLOSURE

Airport runway distance meter adapted to give to an airplane its distance on the runway from a given point thereof. This distance meter comprises a generator of a carrier signal, means for modulating said carrier signal by two audio-frequency modulation signals and forming two amplitude-modulated signals, each including a carrier component and two sideband components, means for adding and subtracting said two amplitude-modulated signals and thereby forming a first signal comprising the carrier component and the sum of the two sideband components and a second signal formed by the difference of the two sideband components, means for attenuating the second signal, a first and a second antenna located sideways with respect to the runway and having identical radiation patterns spaced 90° apart from one another and means for feeding to said first and second antenna said first signal and said attenuated second signal.

---

This invention relates to an airport runway distance meter for supplementing data made available to aircraft by blind landing systems.

It is well known that the instrument landing system (I.L.S.) used at most large airports provides aircraft alignment with the runway and in inclined plane of descent said alignment and said plane being respectively defined by the equality of the depth of modulation of two waves formed by a localizer carrier or a glide-path-carrier, each amplitude-modulated by two audio-frequency signals. Discrete values of the distance from the runway are furnished by three beacons aligned on the axis of descent.

It is an object of the invention to supplement these data so that aircraft on final approach and on the runway may be continuously aware of their distance along the runway axis from a particular point on such axis. A distance measurement of this kind reduces minimum visibility requirements for levelling out at landing, for controlling braking on the runway and for take-off.

Another object of this invention is to provide a localizer-like or glide-path-like indication system adequately modified to meet the following result: the difference in the depths of modulation of two amplitude-modulated waves having the same carrier represents, instead of an angular gap from a given direction, a distance from a given point.

Generally speaking, the distance meter of the invention differs from a conventional localizer or glide-path transmitter primarily by the antenna system and also by the presence in the localizer transmitter circuit of means for selectively attenuating the signals radiated by the transmitter antennae.

The invention provides an airport runway precision distance meter comprising an antenna system having any desired radiation pattern, identical in two rectangular directions and energized by a first signal comprising a carrier modulated with two audio-frequency signals and, via an attenuator, by a second signal formed by the difference of the sidebands of the audio-frequency modulations of the first signal, so as to produce, along the runway axis and at least over the whole length of the runway, two rectangular patterns respectively radiated by the first and second signals, whereby the difference between the auido-freqeuncy modulation depths which is characteristic of the distance from a particular place of the runway. According to the invention, the ratio between the distance of the antenna system from the runway axis and runway length, and the attenuation coefficient of the second signal relatively to the amplitude of the first signal, are so devised that the difference between the modulation depths is zero at one particular place on the runway axis and maximum at at least one other particular place on the runway axis.

According to one particular embodiment of the invention, a landing-runway distance meter comprises a conventional glide-path transmitter conveniently modified as will be explained. This transmitter delivers—at one output a U.H.A. first reference signal having a carrier angular frequency $f$ and amplitude-modulated at 90 Hz. and 150 Hz., the mathematical expression of said signal being:

$$\left[1+\frac{m}{2}\sin 2\pi x 90t+\frac{m}{2}\sin 2\pi x 150t\right]\sin \omega t$$

(with $\omega=2\pi f$ and $m=$depth of modulation)—and at its second output, the sidebands of the signals, the 90 Hz. sideband and the 150 Hz. sidebands being in phase opposition, the mathematical expression of said sidebands being:

$$\frac{m}{2}[\sin 2\pi x 90t - \sin 2\pi x 150t]\sin \omega t$$

It is known that in a conventional glide-path, the first signal is radiated by a central antenna and the second signal by two lateral antennae, these three antennae having patterns in the form of parallel lobes. Roughly, it can be said that the fields from the central and any one of the lateral antennae add together algebraically whereby the radio-frequency signal on one side of the axis of the lobes and apart from the axis is modulated by one audio-frequency signal, the 90 Hz. signal, and the radio-frequency signal on the other side of the axis of the lobes is modulated by the 150 Hz. signal. On the lobe axis, the radio-frequency signal is equally modulated at 90 and 150 Hz. and on both sides of this axis and near the axis, the difference of the modulation depths of the two audio-frequency signals varies from 0 to $m$.

The antennae of the distance meter are differently arranged that the glide-path conventional antennae. The distance meter comprises two horizontal dipoles having a between-axes spacing equal to half the carrier wavelength, the dipoles being dispsed on a parallel to the runway axis at a given distance therefrom near the theoretical touchdown point of aircraft landing on the runway, an antenna bridge and an attenuator, the dipoles being connected via the antenna bridge cophasally with the first output of the glide-path transmitter and in phase opposition, via the attenuator, to the second output of the glide-path transmitter, the attenuation factor of the attenuator being equal to the ratio between, on the one hand, the runway length reckoned from the theoretical touchdown point and, on the other hand, the distance between the dipoles and the runway axis.

Consequently, the difference between the modulation depths is zero at the theoretical touchdown point and maximum—i.e., equal to twice the modulation depth of the audio-frequencies—at the runway exit and at a point symmetrical thereof in relation to the theoretical touchdown point. At a given point of the runway, the modulation depth difference signal is proportional to the distance between such point and the theoretical touchdown point.

The invention will be better understood from the following description and accompanying drawings wherein:

FIG. 1 is a basic diagram of a distance meter according to the invention, and

FIG. 2 is a layout and radiation pattern for the distance meter shown in FIG. 1.

The distance meter comprises a conventional glide-path transmitter 1 which produces a first signal, in the form of a U.H.F. carrier modulated at 90 Hz. and 150 Hz. with equal modulation depths and a second signal formed by the difference of the 90 Hz. and 150 Hz. sideband components of the first signal, such second signal being reduced by an attenuator 3, relatively to the level of the first signal. These sidebands are phase shifted by 180° from one another and are applied to two diagonally opposite inputs of an antenna balancing bridge 4 whose outputs are connected to an antenna system 2. This antenna system comprises two parallel antennae 21, 22 separated from one another by half a wavelength and having any kind of identical radiation patterns, so that the first signal is applied to them cophasally but the second signal is applied with a 180° phase shift because of the presence of a loop 41 in that arm of the bridge 4 which connects attenuator 3 to antenna 22.

The glide-path transmitter 1 is shown in diagrammatic form as comprising a transmitter 10 producing the U.H.F. carrier, adapted to be modulated by a modulator 11 and connected via an intermodulation bridge 12 to two modulation lines 15 (at 150 Hz.) and 16 (at 90 Hz.) of a mechanical modulator driven by a motor 17. There is also provided an output bridge 18 whose diagonally opposite inputs are each connected to the outputs of the modulators 15, 16, while the first output of bridge 18 transmits the reference carrier modulated at both 90 Hz. and 150 Hz., e.g. at a modulation depth $m/2=0.45$, to an input of the antenna bridge 4, while the second output of bridge 18 delivers sidebands of the audio-frequency modulations of the reference carrier, with a 180° phase shift produced by a phase-shifting loop 19, to the input of attenuator 3 and therethrough to the second input of bridge 4. The bridge 12 helps to reduce interaction between the 90 Hz. and 150 Hz. modulations and comprises four equal line lengths, one introducing a 180° phase shift by a crossover of its two conductors, symbolized by a loop 13 in the one-wire diagram of FIG. 1. Bridge 12 is balanced by a reactive impedance 14 connected to the bridge terminal diagonally opposite the bridge terminal connected to the output of transmitter 10.

The attenuator 3, shown symbolically as a variable resistance, is, as will be seen with reference to FIG. 2, adjusted for maximum possible accuracy of the system.

The antenna system 2 can comprise e.g., two parallel horizontal dipoles 21, 22, preferably in association with reflectors 23, 24 to reduce backward radiation and with their axes spaced apart from one another by half a wavelength. It is known that the radiation patterns of two such dipoles is substantially formed by two tangent circles, the center line of these two circles having a given direction when the dipoles are fed with zero phase-shift and the direction perpendicular to said given direction when the dipoles are fed with 180° phase-shift (see Principles of Radar, McGraw-Hill Book Company, 1946). As a variant, the system 2 can take the form of two stacked horizontal dipoles offset angularly from one another by 90° and energized in the same way as the dipoles 21, 22 of FIG. 1.

FIG. 2 shows the layout of the antenna system 2 in relation to a runway 5 of axis 50; also shown in FIG. 2 are the radiation patterns of system 2 for the reference signal $E_1$ R, R' and for the sideband signal $E_2$ L, L' near the runway 5. The antennae 2 are positioned e.g. at a place G very near the glide-path antennae at a distance $d$ from the runway axis 50 on the perpendicular thereto at the theoretical touchdown point I of aircraft landing on runway 5. If an axis $Gx$ is drawn parallel to the runway axis 50, the doublets 21, 22 which as compared with the runway must be considered unitary have their arms disposed along the $x$ axis, the axis of the doublet 21 having an abscissa equal to $-\lambda/4$ and the axis of the doublet 22 having an abscissa equal to $+\lambda/4$. The $y$ axis perpendicular at G to the $x$ axis passes through the point I.

Except for the reflectors 23, 24, the theoretical radiation pattern of the doublets 21, 22 relative to the reference signal applied cophasally to the two antennae consists of two circles R, R' tangential to the $x$-axis at G. Also, for the difference signal between the 90 Hz. and 150 Hz. sidebands which are applied to the antennae 21 and 22 with a 180° phase difference, the theoretical radiation pattern is formed by two circles L, L' tangential to the $y$-axis at G, and the circle L corresponding to a positive difference $\Delta$ between the 90 and 150 Hz. modulation depths—i.e., to predominance of the 90 Hz. modulation—whereas the circle L' corresponds to a difference $\Delta<0$.

Since these radiation patterns are considerably attenuated for negative values of $y$, consideration will be given hereinafter only to the circle R and the semicircles L, L' of positive ordinates.

The signal radiated by atennae 21 and 22 cophasally is:

$$E_1 = A\left[\sin \omega t + \frac{m}{2}\sin \omega_{90}t \sin \omega t + \frac{m}{2}\sin \omega_{150}t \sin \omega t\right] \quad (1)$$

and the signal radiated by antennae 21 and 22 in phase opposittion is:

$$E_2 = \chi A\left[\frac{m}{2}\sin \omega_{90}t \sin \omega t - \frac{m}{2}\sin \omega_{150}t \sin \omega t\right] \quad (2)$$

where $\omega_{90} = 2\pi \times 90$
$\omega_{150} = 2\pi \times 150$
$\chi$ = attenuation factor of attenuator 3.

At a point $m$ of the runway, in a direction forming an angle $\theta$ with the line perpendicular to the line joining the dipoles, i.e. with axis $Oy$, the resulting field from antennae 21–22 is $$A(\cos \theta + \chi \sin \theta)$$

and the difference of modulation depths of the audio-frequency signals at 90 and 150 Hz. is:

$$\frac{m}{2\cos \theta}\left[(\cos \theta + \chi \sin \theta) - (\cos \theta - \chi \sin \theta)\right] = m\chi \tan \theta$$

so that the difference between the modulation depths at any point on the runway axis is proportional to tan $\theta$, that is to the distance of such point from the point I.

The ratio $\chi$ is so adjusted by means of the attenuator 3 that at the end of the runway—i.e., at the point S to which the angle $\theta_s$ corresponds:

$$A \cos \theta_s = B \sin \theta_s$$

i.e., the maximum modulation level difference $\Delta = m$ or e.g. $\Delta = 0.9$.

If, for instance, $GI = d = 300$ meters and, except for the short distance between the runway entry E and the point I, runway length $IS = 3000$ meters, then:

$$\tan \theta_s = \frac{3000}{300} = 10$$

and $$\chi = 1/10$$

The attenuator 3 is therefore adjusted to $\chi \simeq 0.1$ for the 90 and 150 Hz. sidebands.

The receiving equipment to be carried by aircraft for using the distance meter hereinbefore described is identical to glide-path receiving equipment. If it is required to use both the glide-path and the distance meter facilities, the carrier frequency of the distance meter differs from the glide-path frequency and the aircraft carries two separate receiving facilities tuned to the respective frequencies.

If it is considered that the glide-path ceases to be useful at a particular point, for instance, when the aircraft passes over the runway entry E, the glide-path receiving equipment can be used for the distance meter thereafter. One advantageous solution of this problem is to use for the distance meter a transmitter 10 whose frequency is slightly offset from the glide-path transmitter and for each of the two distance meter transmitting antennae to have a uni-directional radiation pattern centered to permit rapid changeover from glide-path reception to distance meter reception, the speed of such changeover being due to the high angular speed of an aircraft passing over the runway entry E relatively to the site G of the antennae 2.

For a transmitter and receiver stability equivalent to that of the glide-path, giving an accuracy of 0.002 on the difference $\Delta$ between the modulation levels, the standard difference for distance measurement is around 7 meters. Its great accuracy makes this distance measurement very suitable for assisting levelling-out at landing, in co-operation with simultaneous altitude measurement by radiosonde. The system is also of use for taxiing, more particularly at takeoff. The system enables a landing system to be based on the simultaneous measurement of distance by the distance meter according to the invention and of altitude by a radiosonde, the angle of descent being selectable as required in accordance with the particular kind of aircraft concerned.

What I claim is:

1. An airport runway distance meter comprising a generator of a carrier signal, modulator means for amplitude-modulating to the same modulation depth said carrier signal by two audio-frequency modulation signals and thereby forming two amplitude-modulated signals, each including a carrier component and two sideband components, means for adding and subtracting said two amplitude-modulated signals and thereby forming a first signal comprising the carrier component and the sum of the two sideband components of the two amplitude-modulated signals and a second signal formed by the difference of said two sideband components, means for selectively attenuating said second signal, a first and a second antenna located sideways with respect to said runway on the perpendicular thereof passing through the aircraft touchdown point and having identical radiation patterns, 90° apart from one another and means for feeding to said first and second antenna said first signal and said attenuating second signal respectively, whereby the difference of modulation depth of the two audio-frequency signals measured at a given point of the runway is proportional to the distance of said point from said touchdown point.

2. An airport runway distance meter comprising a generator of a carrier signal, modulator means for amplitude-modulating with the same modulation depth said carrier signal by two audio-frequency modulation signals and thereby forming two amplitude-modulated signals, each including a carrier component and two sideband components, means for adding and subtracting said two amplitude-modulated signals and thereby forming a first signal comprising the carrier component and the sum of the two sideband components of the two amplitude-modulated signals and a second signal formed by the difference of said two sideband components, means for attenuating, with a given attenuation factor, said second signal, a first and a second antenna located at a distance $d$ on the perpendicular to the runway at the touchdown point thereof, and having identical radiation patterns, 90° apart from one another and means for feeding said first and second antenna respectively by said first signal and said attenuated second signal, whereby the difference $\Delta$ of the modulation depths of the two sideband components at a given point of the runway distance by $l$ from said touchdown point is equal to the product $m, x, l/d,$ where $m$ is the modulation depth and $x$ said given attenuation factor.

3. An airport runway distance meter comprising a generator of a carrier signal, modulator means for amplitude-modulating with the same modulation depth said carrier signal by two audio-frequency modulation signals and thereby forming two amplitude-modulated signals, each including a carrier component and two sideband components, means for adding and subtracting said two amplitude-modulated signals and thereby forming a first signal comprising the carrier component and the sum of the two sidebands components of the two amplitude-modulated signals and a second signal formed by the difference of said two sideband components, means for attenuating, with a given attenuation factor, said second signal, a first and a second dipole antenna located at a distance $d$ on the perpendicular to the runway at the touchdown point thereof, and having identical radiation patterns, said pattern having a given axis when said two antennae are energized cophasally and an axis perpendicular ot said given axis when said two antennae are energized in phase-opposition, and means for feeding said first and second antenna cophasally by said first signal and in phase-opposition by said attenuated second signal, said runway having, between said touchdown point and its end, a length L and the difference $\Delta$ of the modulation depths of the two sideband components at the end of the runway being taken substantially equal to twice said modulation depth, whereby said attenuating factor $x$ is substantially equal to the ratio $d/L$.

References Cited

UNITED STATES PATENTS

| | | | |
|---|---|---|---|
| 2,143,137 | 1/1939 | Basim et al. | 343—108 |
| 2,393,337 | 1/1946 | Phillips. | |
| 2,943,321 | 6/1960 | Karpeles | 343—107 X |

FOREIGN PATENTS 628,956    9/1949    Great Britain.

RODNEY D. BENNETT, JR., Primary Examiner

H. C. WAMSLEY, Assistant Examiner